United States Patent
Wu (10) Patent No.: US 11,272,480 B2
(45) Date of Patent: Mar. 8, 2022

(54) METHOD FOR INDICATING RESOURCE LOCATION TO RECEIVE BROADCAST MESSAGE, NETWORK DEVICE, USER EQUIPMENT AND SYSTEM

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 46 days.

(21) Appl. No.: 16/637,946

(22) PCT Filed: Aug. 7, 2018

(86) PCT No.: PCT/CN2018/099122
§ 371 (c)(1),
(2) Date: Feb. 10, 2020

(87) PCT Pub. No.: WO2019/029511
PCT Pub. Date: Feb. 14, 2019

(65) Prior Publication Data
US 2020/0205126 A1    Jun. 25, 2020

(30) Foreign Application Priority Data
Aug. 11, 2017    (CN) .......................... 201710687216.3

(51) Int. Cl.
*H04W 72/00*    (2009.01)
*H04L 5/00*    (2006.01)
(Continued)

(52) U.S. Cl.
CPC ......... *H04W 72/005* (2013.01); *H04L 5/0092* (2013.01); *H04W 68/005* (2013.01); *H04W 72/042* (2013.01); *H04W 72/1257* (2013.01)

(58) Field of Classification Search
CPC ............. H04W 72/005; H04W 68/005; H04W 72/042; H04W 72/1257; H04W 4/06; H04W 72/0453; H04L 5/0092
See application file for complete search history.

(56) References Cited

U.S. PATENT DOCUMENTS

2010/0103894 A1* 4/2010 Cho ...................... H04L 5/0037
370/329
2011/0188427 A1* 8/2011 Ishii .................... H04W 52/367
370/311
(Continued)

FOREIGN PATENT DOCUMENTS

CN    1829340 A    9/2006
CN    101159975 A    4/2008
(Continued)

OTHER PUBLICATIONS

Chinese First Office Action Application No. 201710687216.3; dated Dec. 2, 2019.
(Continued)

*Primary Examiner* — Jael M Ulysse
(74) *Attorney, Agent, or Firm* — von Briesen & Roper, s.c.

(57) ABSTRACT

A method, a device and a system for indicating a resource location to receive a broadcast message are provided. The method includes: the network device generating resource location indication information of the broadcast message, and transmitting the resource location indication information to a UE. The resource location indication information comprises an identifier of at least one bandwidth part (BWP) and resource location information corresponding to each BWP in the at least one BWP, and the resource location information is used to indicate the resource location where the UE receives the broadcast message transmitted by the network device.

20 Claims, 5 Drawing Sheets

(51) Int. Cl.
  *H04W 68/00* (2009.01)
  *H04W 72/04* (2009.01)
  *H04W 72/12* (2009.01)

(56) References Cited

U.S. PATENT DOCUMENTS

| | | | | |
|---|---|---|---|---|
| 2011/0188441 | A1* | 8/2011 | Kim | H04W 72/005 370/312 |
| 2011/0267996 | A1* | 11/2011 | Guan | H04W 72/042 370/280 |
| 2011/0268070 | A1* | 11/2011 | Guan | H04L 5/0053 370/329 |
| 2014/0010169 | A1* | 1/2014 | Novak | H04W 72/085 370/329 |
| 2015/0110056 | A1* | 4/2015 | Wang | H04L 1/0025 370/329 |
| 2015/0195814 | A1* | 7/2015 | Li | H04L 5/0053 370/329 |
| 2015/0208208 | A1* | 7/2015 | You | H04W 72/005 370/312 |
| 2016/0014778 | A1* | 1/2016 | Zhou | H04L 5/0058 370/252 |
| 2016/0212731 | A1* | 7/2016 | Zhang | H04L 5/0055 |
| 2017/0324524 | A1* | 11/2017 | Zhou | H04L 5/0007 |
| 2017/0332368 | A1* | 11/2017 | Einhaus | H04W 16/28 |
| 2018/0049068 | A1* | 2/2018 | Agiwal | H04W 74/0833 |
| 2018/0097678 | A1* | 4/2018 | Zhou | H04L 5/0005 |
| 2018/0184410 | A1* | 6/2018 | John Wilson | H04L 5/001 |
| 2018/0192383 | A1* | 7/2018 | Nam | H04W 48/12 |
| 2019/0149383 | A1* | 5/2019 | Ko | H04L 27/2666 370/329 |
| 2019/0356524 | A1* | 11/2019 | Yl | H04B 7/0695 |
| 2020/0059390 | A1* | 2/2020 | Zhang | H04L 1/0004 |

FOREIGN PATENT DOCUMENTS

| | | |
|---|---|---|
| CN | 101841769 A | 9/2010 |
| CN | 101998597 A | 3/2011 |
| CN | 102195745 A | 9/2011 |
| CN | 103825670 A | 5/2014 |
| WO | WO 2014153752 A1 | 10/2014 |
| WO | WO 2016161592 A1 | 10/2016 |
| WO | WO 2017/034507 A1 | 3/2017 |

OTHER PUBLICATIONS

European Search Report Application No. 18844959.9; dated Jun. 3, 2020.

International Search Report & Written Opinion related to Application No. PCT/CN2018/099122; dated Sep. 26, 2018.

Samsung; "Remaining details on multipie SS block transmission in wideband CC", 3GPP TSG RAN WG1 NR Ad-Hoc#2, R1-1710626, Qingdao, China, Jun. 27, 2017-Jun. 30, 2017.

Panasonic; "On default bandwidth part", 3GPP TSG-RAN WG1 NR Ad-Hoc#2, R1-1710787, Qingdao, P.R. China Jun. 27, 2017-Jun. 30, 2017.

Mediatek Inc.; "Further Details on Wider Bandwidth Operations in NR", 3GPP TSG RAN WG1 NR Ad-Hoc#2, RI-17010796, Qingdao, P.R. China, Jun. 27, 2017-Jun. 30, 2017.

* cited by examiner

METHOD FOR INDICATING RESOURCE LOCATION TO RECEIVE BROADCAST MESSAGE, NETWORK DEVICE, USER EQUIPMENT AND SYSTEM

CROSS-REFERENCE TO RELATED APPLICATION

This patent application is a 35 USC § 371 U.S. national stage of international Application No. PCT/CN2018/099122 filed on Aug. 7, 2018, which claims a priority to Chinese Patent Application No. 201710687216.3 filed on Aug. 11, 2017, both disclosures of which are incorporated in their entireties by reference herein.

TECHNICAL FIELD

The present disclosure relates to the field of wireless communication technologies, and in particular to a method, a device, and a system for indicating a resource location to receive a broadcast message.

BACKGROUND

With the rapid development of communication technologies, in a long term evolution (LTE) system, devices on a network side (including an access network and a core network) can transmit system information and a paging message to a user equipment (UE) by broadcasting information.

Generally, in an LTE system, a network-side device (hereinafter referred to as a network device) may transmit broadcast information through a broadcast channel. The broadcast information broadcasted by the network device may include system information and paging messages. In a case that a message broadcasted by the network device is system information, the UE receives the system information broadcasted by the network device, so that the UE can access a cell served by the network device and perform data transmission. In a case that the network device broadcasts a paging message, the network device may obtain location information of the UE by broadcasting the paging message, or the network device may notify the UE of system information update through the paging message, or notify the UE that a new service needs to be processed through the paging message. After the UE receives the paging message broadcasted by the network device, the UE can learn whether the system information is changed, or whether there is any new service required to be processed.

However, in the above-mentioned LTE system, the network device and the UE communicate with each other by using a system bandwidth (that is, a total bandwidth supported by a cell), while in a future system using a $5^{th}$ generation (5G) mobile communication technology (referred to as 5G system in the following), multiple bandwidth parts (BWPs) can be supported. That is, a system bandwidth may be divided into multiple BWPs (which may be deemed as multiple narrow bandwidths), and a working bandwidth of the UE may be one BWP. In this scenario, if the network device and the UE continue to use the system bandwidth to transmit system information and paging messages, the UE may fail to receive a broadcast message from the network device, as a working bandwidth of the UE is one BWP of multiple BWPs in system bandwidth supported by a cell, and the UE may work in a narrow bandwidth.

SUMMARY

In a first aspect, an embodiment of the present disclosure provides a method for indicating a resource location to receive a broadcast message, which is applied to a network device and includes: generating, by the network device, resource location indication information of the broadcast message, where the resource location indication information includes an identifier of at least one bandwidth part (BWP) and resource location information corresponding to each BWP in the at least one BWP, and the resource location information is used to indicate the resource location where a user equipment (UE) receives the broadcast message transmitted by the network device; and transmitting, by the network device, the resource location indication information to the UE.

Optionally, after transmitting, by the network device, the resource location indication information to the UE, the method further includes: transmitting, by the network device, the broadcast message to the UE at at least one resource location indicated by the resource location information.

Optionally, the resource location indication information includes at least one of the following four types of indication information:

time-domain indication information for the UE to receive the broadcast message;

frequency-domain indication information for the UE to receive the broadcast message;

code-domain indication information for the UE to receive the broadcast message; or space-domain indication information for the UE to receive the broadcast message.

Optionally, the time-domain indication information includes at least one of: a time when the UE receives the broadcast message, a cycle during which the UE receives the broadcast message, a length of a subframe where the UE receives the broadcast message, or a length of a cyclic prefix (CP) of an orthogonal frequency division multiplexing (OFDM) symbol where the UE receives the broadcast message; and/or the frequency-domain indication information includes at least one of: a location of a physical resource block (PRB) where the UE receives the broadcast message, a spacing of a subcarrier where the UE receives the broadcast message, a frequency point where the UE receives the broadcast message, an identifier of a BWP where the UE receives the broadcast message, or a bandwidth of a frequency where the UE receives the broadcast message; and/or the code-domain indication information includes at least one of: an encoding manner in which the UE receives the broadcast message, or an identifier of an encoding manner in which the UE receives the broadcast message; and/or the space-domain indication information includes at least one of: an identifier of a transmission node where the UE receives the broadcast message, an identifier of a beam through which the UE receives the broadcast message, an identifier of a beam group through which the UE receives the broadcast message, or an identifier of a beam pair through which the UE receives the broadcast message.

Optionally, the broadcast message includes at least one of: a master information block (MIB), remaining system information (RMSI), RMSI scheduling information, other system information (OSI), OSI scheduling information, a paging message, or scheduling information of a paging message.

Optionally, the method further includes: transmitting, by the network device, first control information to the UE, in a case that it is determined that a frequency range in which the broadcast message is transmitted by the network device is not within a first frequency range. The first control information includes a second frequency range, and the first control information is used to indicate switching a frequency range in which the UE works from the first frequency range to the second frequency range, the first frequency range is a frequency range in which the UE currently works, and the frequency range in which the broadcast message is transmitted is within the second frequency range.

Optionally, the method further includes: transmitting, by the network device, second control information to the UE, in a case that it is determined that the UE has switched a frequency range in which the UE works from a first frequency range to a second frequency range, and the UE has successfully received the broadcast message within the second frequency range. The second control information includes the first frequency range, and the second control information is used to indicate re-switching the frequency range in which the UE works from the second frequency range to the first frequency range.

In a second aspect, an embodiment of the present disclosure provides a network device, including a generation module and a transmission module. The generation module is configured to generate resource location indication information of a broadcast message, where the resource location indication information includes an identifier of at least one bandwidth part (BWP) and resource location information corresponding to each BWP in the at least one BWP, and the resource location information is used to indicate a resource location where a user equipment (UE) receives the broadcast message transmitted by the network device. The transmission module is configured to transmit the resource location indication information to the UE.

In a third aspect, an embodiment of the present disclosure provides a network device, which can implement functions performed by the network device in the foregoing method embodiment. The functions may be implemented by hardware, or may be implemented by hardware executing corresponding software. The hardware or the software includes one or more modules corresponding to the above functions.

In a possible design, the network device may include a processor, a memory, and a program that is stored on the memory and executable on the processor. When the program is executed, the processor is configured to implement the method for indicating a resource location to receive a broadcast message according to the above aspect.

In a fourth aspect, an embodiment of the present disclosure provides a computer-readable storage medium. The computer-readable storage medium stores a program, and the program is executed by a processor of the network device to implement the method for indicating a resource location to receive a broadcast message described in the various optional implementations in the above aspect.

In a fifth aspect, an embodiment of the present disclosure provides a method for indicating a resource location to receive a broadcast message, including:

obtaining, by a UE, resource location indication information of the broadcast message, where the resource location indication information includes an identifier of at least one bandwidth part (BWP) and resource location information corresponding to each BWP in the at least one BWP, and the resource location information is used to indicate the resource location where the UE receives the broadcast message transmitted by the network device; and receiving, by the UE, the broadcast message transmitted by the network device based on indication of the resource location indication information.

Optionally, the obtaining, by the UE, the resource location indication information includes: receiving, by the UE, the resource location indication information transmitted by the network device; or obtaining, by the UE, predefined resource location indication information.

Optionally, the receiving, by the UE, the broadcast message transmitted by the network device based on indication of the resource location indication information includes:

receiving, by the UE, the broadcast message within a first frequency range based on the resource location indication information, in a case that a frequency range in which the broadcast message is transmitted by the network device is within the first frequency range, where the first frequency range is a frequency range in which the UE currently transmits data; and switching, by the UE, a frequency range in which the UE works to a second frequency range, and receiving the broadcast message within the second frequency range based on the resource location indication information, in a case that the frequency range in which the broadcast message is transmitted by the network device is not within the first frequency range, where the frequency range in which the broadcast message is transmitted is within the second frequency range.

Optionally, the receiving, by the UE, the broadcast message transmitted by the network device based on indication of the resource location indication information includes:

receiving, by the UE, first control information transmitted by the network device, where the first control information includes a second frequency range, the first control information is used to indicate switching a frequency range in which the UE works from a first frequency range to the second frequency range, the first frequency range is a frequency range in which the UE currently transmits data, and a frequency range in which the broadcast message is transmitted is within the second frequency range; and switching, by the UE, the frequency range in which the UE works from the first frequency range to the second frequency range based on the first control information, and receiving, by the UE, the broadcast message within the second frequency range based on the resource location indication information.

Optionally, after receiving, by the UE, the broadcast message based on the resource location indication information, the method further includes: re-switching, by the UE, the frequency range in which the UE works from the second frequency range to the first frequency range.

Optionally, after receiving, by the UE, the broadcast message based on the resource location indication information, the method further includes:

receiving, by the UE, second control information transmitted by the network device, where the second control information includes the first frequency range, and the second control information is used to indicate re-switching the frequency range in which the UE works from the second frequency range to the first frequency range; and re-switching, by the UE, the frequency range in which the UE works from the second frequency range to the first frequency range based on the second control information.

In a sixth aspect, an embodiment of the present disclosure provides a UE, including:

an obtaining module, configured to obtain resource location indication information of a broadcast message, where the resource location indication information includes an identifier of at least one bandwidth part (BWP) and resource location information corresponding to each BWP in the at least one BWP, and the resource location information is used to indicate a resource location where the UE receives the broadcast message transmitted by the network device; and a reception module, configured to receive the broadcast message transmitted by the network device based on indication of the resource location indication information.

In a seventh aspect, an embodiment of the present disclosure provides a UE. The UE can implement functions performed by the UE in the method embodiment in the fifth aspect, and the functions may be implemented by hardware or corresponding software when being executed by hardware. The hardware or the software includes one or more modules corresponding to the foregoing functions.

In a possible design, a structure of the UE includes a processor, a memory, and a program that is stored on the memory and executable on the processor. When the program is executed, the processor is configured to implement the method for indicating a resource location to receive a broadcast message in above fifth aspect.

In an eighth aspect, an embodiment of the present disclosure provides a computer-readable storage medium. A program is stored on the computer-readable storage medium, and the program is executed by a processor of the UE to implement the method for indicating a resource location to receive a broadcast message described in the various optional implementations in the above fifth aspect.

In a ninth aspect, an embodiment of the present disclosure provides a communication system, which includes: the network device described in any of the foregoing optional implementations; and the UE described in any of the foregoing optional implementations.

BRIEF DESCRIPTION OF THE DRAWINGS

In order to illustrate technical solutions of some embodiments of the present disclosure more clearly, drawings used in description of some embodiments of the present disclosure will be described hereinafter briefly. Obviously, the following drawings merely relate to some embodiments of the present disclosure, and based on these drawings, a person skilled in the art may obtain other drawings without paying creative effort.

DETAILED DESCRIPTION

In order to illustrate technical solutions of some embodiments of the present disclosure more clearly, the drawings used in the description of the embodiments of the present disclosure are briefly described below. Obviously, the drawings in the following description are only some embodiments of the present disclosure. For a person of ordinary skill in the art, other drawings can be obtained based on these drawings without paying creative labor.

Such term as "and/or" in this specification is only a kind of association relationship describing related objects, and refers to that there may be three kinds of relationships. For example, "A and/or B" can refer to three cases: A exists alone, both A and B exist simultaneously, and B exists alone.

The terms "first", "second", or the like in the specification and claims of the embodiments of the present disclosure are used to distinguish different objects, rather than to describe a specific order of the objects. For example, a first frequency range, a second frequency range, and the like are used to distinguish different frequency ranges, and are not used to describe a specific order of the frequency ranges.

In the embodiments of the present disclosure, words such as "exemplary" or "for example" are used as example, illustration or description. Any embodiment or design scheme described as "exemplary" or "for example" in the embodiments of the present disclosure should not be construed as more optional or advantageous than other embodiments or design schemes. More exactly, the use of the words "exemplary" or "for example" are intended to present relevant concepts in a specific manner.

In the description of the embodiments of the present disclosure, unless otherwise stated, the meaning of terms such as "a plurality of" or "multiple" means two or more. For example, a plurality of processing units refers to two or more processing units; and multiple systems refer to two or more systems.

First, some concepts involved in a method, a device and a system for indicating a resource location to receive a broadcast message provided by embodiments of the present disclosure are explained.

Figure 1:
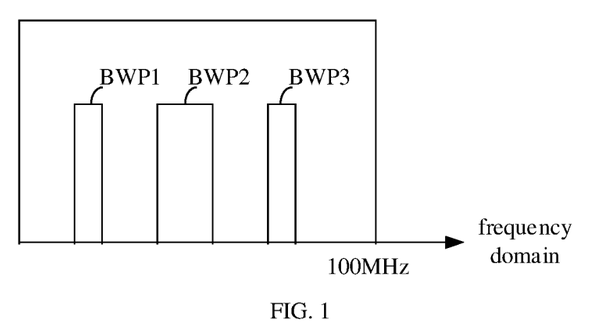
FIG. 1 is a schematic diagram of a BWP according to an embodiment of the present disclosure.

For future systems using $5^{th}$ Generation (5G) mobile communication technology (hereinafter referred to as 5G systems), or super 4G systems, or post-LTE systems, for example, in the 5G new radio (NR) protocol, the total bandwidth of a cell where a UE works is 100M (megabytes), and a working bandwidth supported by the UE may be relatively narrow, such as 20M. In such way, a base station of the cell needs to allocate 20M from the bandwidth of 100M as a working bandwidth of the UE. This working bandwidth can be referred to as BWP. Exemplarily, as shown in FIG. 1, for a system bandwidth of 100M, the system bandwidth of 100M can be divided into a BWP1 of 20M, a BWP2 of 30M and a BWP3 of 50M according to numerology (including a series of parameters, such as a subcarrier spacing, a length of a symbol, and a length of a cyclic prefix of the symbol).

Figure 2:
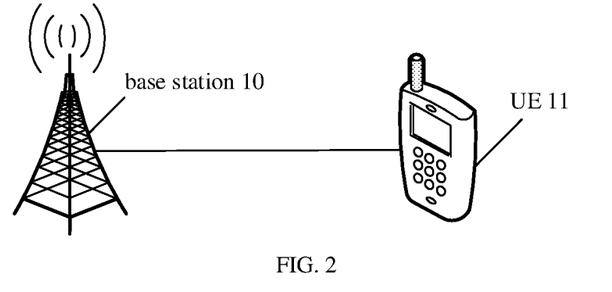
FIG. 2 is a schematic architecture diagram of a communication system according to an embodiment of the present disclosure.

The method for indicating a resource location to receive a broadcast message provided by the embodiments of the present disclosure can be applied to a wireless communication system. The wireless communication system may be a system using a $5^{th}$ generation (5G) mobile communication technology (referred to as 5G system in the following). Reference is made to FIG. 2, which is a schematic diagram of a wireless communication system according to an embodiment of the present disclosure. As shown in FIG. 2, the wireless communication system may include a core network device 10, an access network device 11, and a UE 12. After accessing an access network, the UE 12 may communicate with the access network device 11 (for example, a base station), or may communicates with the core network device 10 (for example, a mobile management entity (MME), or a gateway) in the core network via the access network device 11. In practical applications, connections between the foregoing devices may be a wireless connection. In order to conveniently and intuitively represent a connection relationship between the various devices, FIG. 2 illustrates the connection relationship by using a solid line.

It should be noted that, in the following embodiments, the core network device and the access network device are collectively referred to as network device. In the embodiments of the present disclosure, the communication system may include multiple UEs, and a network device may exchange data with multiple UEs.

Figure 3:
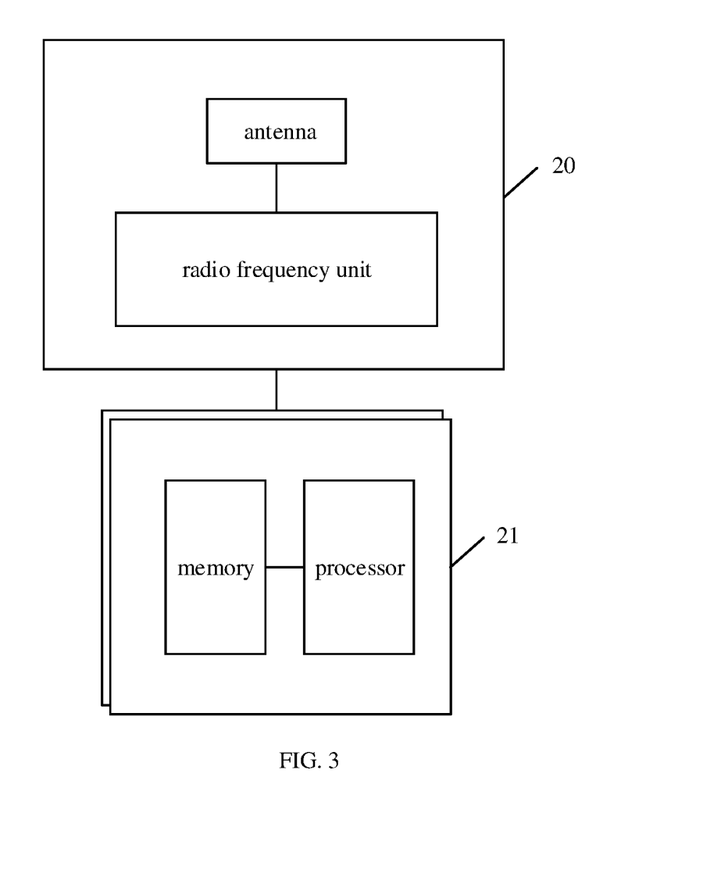
FIG. 3 is a hardware schematic diagram of a base station according to an embodiment of the present disclosure.

In the embodiments of the present disclosure, an example is given that a network device is an access network device. The access network device may be devices such as a commonly used base station, an evolved node base station (eNB), or a network equipment in a 5G system (for example, a next generation node base station (gNB) or a transmission and reception point (TRP)). Exemplarily, a hardware structure of a network device is described in the embodiments of the present disclosure by taking a commonly used base station as an example. Components of a base station provided by an embodiment of the present disclosure is described in detail below with reference to FIG. 3. As shown in FIG. 3, the base station provided by the embodiment of the present disclosure may include a part 20 and a part 21. The part 20 is mainly configured to receive and transmit a radio frequency signal and convert the radio frequency signal to a baseband signal. The part 21 is mainly used for baseband processing and controlling the base station. The part 20 can usually be referred to as a transceiver unit, a transmitting and receiving component, a transmitting and receiving circuit, or a transceiver. The part 21 is usually the control center of the base station, which can usually be called a processing unit, and is configured to control the base station to perform relevant steps performed by the base station (that is, a serving base station) in FIG. 3. Reference can be made to the description of the above relevant part for details of the steps.

The transceiver unit of the part 20 can also be referred to as a transmitting and receiving component, or a transceiver, etc. The transceiver unit includes an antenna and a radio frequency unit. The radio frequency unit is mainly used for radio frequency processing. Optionally, components in the part 20 used to implement a receiving function can be regarded as a reception unit, and components in the part 20 used to implement a transmitting function can be regarded as a transmission unit, that is, the part 20 includes the reception unit and the transmission unit. The reception unit may also be referred to as a receiver, a receiving component, or a receiving circuit, and the transmission unit may be referred to as a transmitter, a transmitting component, or a transmitting circuit.

The part 21 may include one or more single boards, and each single board may include one or more processors and one or more memories. The processor is configured to read and execute programs in the memory to implement baseband processing functions and to control the base station. If there are multiple boards, the multiple boards can be interconnected to increase processing capacity. As an optional implementation, multiple boards may share one or more processors, or multiple boards may share one or more memories, or multiple boards may share one or more processors at the same time. The memory and the processor may be integrated together, or may be independently arranged. In some embodiments, the part 20 and the part 21 may be integrated together or provided separately. In addition, all functions in the part 21 may be implemented in one integrated chip; or part of the functions may be integrated in one chip, and the other functions may be implemented in one or more chips, which is not limited in this application.

The UE provided in the embodiments of the present disclosure may be a mobile phone, a tablet computer, a laptop, an ultra-mobile personal computer (UMPC), a netbook, or a personal digital assistant (PDA), etc.

Figure 4:
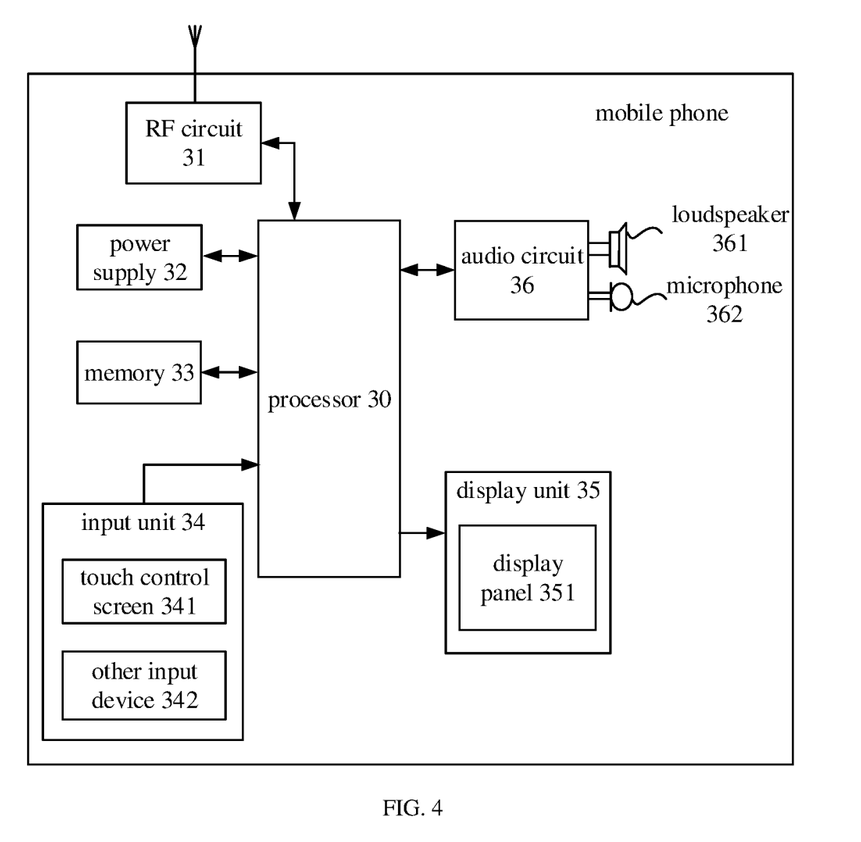
FIG. 4 is a hardware schematic diagram of a mobile phone according to an embodiment of the present disclosure.

Exemplarily, a hardware structure of the UE is introduced in embodiments of the present disclosure by taking an example that the UE is a mobile phone. Various components of the mobile phone provided by an embodiment of the present disclosure is described in detail below with reference to FIG. 4. As shown in FIG. 4, the mobile phone provided in the embodiment of the present disclosure includes a processor 30, a radio frequency (RF) circuit 31, a power supply 32, a memory 33, an input unit 34, a display unit 35, and an audio circuit 36. It may be understood by a person of ordinary skill in the art that the structure of the mobile phone shown in FIG. 4 does not constitute a limitation on a mobile phone, which may include more or less components than those shown in FIG. 4, or some components as shown in FIG. 4 may be combined. Optionally, some components of a mobile phone may be arranged in a manner different from a component arrangement manner as shown in FIG. 4.

The processor 30 is a control center of the mobile phone, and connects various parts of the entire mobile phone by using various interfaces and lines. The processor 30 performs various functions and data processing of the mobile phone by running or executing software programs and/or modules stored in the memory 33 and invoking data stored in the memory 33, thereby achieving overall monitoring of the mobile phone. Optionally, the processor 30 may include one or more processing units. Optionally, the processor 30 may integrate an application processor and a modem processor. The application processor is mainly configured to process an operating system, a user interface, and an application program, and the modem processor is mainly configured to process wireless communications. It can be understood that the foregoing modem processor may also be a processor that exists separately from the processor 30.

The RF circuit 31 may be configured to receive and send information, or to receive and send signals during communications. For example, the RF circuit delivers downlink information received from a base station to the processor 30 for processing; and additionally, the RF circuit transmits uplink data to the base station. Generally, the RF circuit 31 includes, but not limited to, an antenna, at least one amplifier, a transceiver, a coupler, a low noise amplifier (LNA) and a duplexer. In addition, the mobile phone can also perform wireless communication with other devices in the network through the RF circuit 31. The wireless communication may use any communication standard or protocol, including but not limited to: global system of mobile communication (GSM), general packet radio service (GPRS), code division multiple access (CDMA), wideband code division multiple access (WCDMA), long term evolution (LTE), E-mail, and short messaging service (SMS).

The power supply 32 may be configured to power various components of the mobile phone, and the power supply 32 can be a battery. Optionally, the power supply may be logically connected to the processor 30 via a power management system, so as to implement functions such as charging or discharging management, and power consumption management by using the power management system.

The memory 33 may be configured to store software programs and/or modules. The processor 30 implements various functional applications and data processing of the mobile phone by running the software programs and/or modules stored in the memory 33. The memory 33 may mainly include a program storage area and a data storage area, where the program storage area may store an operating system, an application required for at least one function (such as a sound play or playback function, and an image play or playback function), and the like; and the data storage area may store data created according to the use of a mobile phone (such as audio data, image data, and a phone book). In addition, the memory 33 may include a high-speed random access memory, and a non-volatile memory, such as at least one magnetic disk storage device, a flash memory device, or other volatile solid-state storage devices.

The inputting unit 34 may be configured to receive input numeric or character information, and to generate a key signal input related to user setting and function control of the mobile phone. Specifically, the inputting unit 34 may include a touch control screen 341 and other input device 342. The touch control screen 341 is also referred to as a touch panel, which may collect a touch operation thereon or thereby (for example, an operation on or around the touch control screen 341 that is made by a user with a finger, a touch pen and any other suitable object or accessory), and drive corresponding connection devices according to a pre-set procedure. Optionally, the touch control screen 341 may include a touch detection device and a touch controller. The touch detection device detects touch orientation of a user, detects a signal generated by the touch operation, and transmits the signal to the touch controller. The touch controller receives touch information from the touch detection device, converts the touch information into touch coordinates and transmits the touch coordinates to the processor 30. The touch controller can also receive a command from the processor 30 and execute the command. In addition, the touch control screen 341 may be implemented by, for example, a resistive panel, a capacitive panel, an infrared panel and a surface acoustic wave panel. The other input device 342 may include, but not limited to, one or more of: a physical keyboard, a function key (such as a volume control button, and a power switch button), a trackball, a mouse and a joystick.

The display unit 35 may be configured to display information inputted by a user or information provided to the user and various menus of the mobile phone. The display unit 35 may include a display panel 351. Optionally, the display panel 351 may be configured in a form of a liquid crystal display (LCD), an organic light-emitting diode (OLED) or the like. In addition, the display panel 351 may be covered by the touch control screen 341. When the touch control screen 341 detects a touch operation thereon or thereby, the touch control screen 341 transmits the touch operation to the processor 30 to determine the type of the touch event, and then the processor 30 provides a corresponding visual output on the display panel 351 according to the type of the touch event. Although the touch control screen 341 and the display panel 351 implement the input and output functions of the mobile phone as two separate components as shown in FIG. 4, the touch control screen 341 and the display panel 351 may be integrated together to implement the input and output functions of the mobile phone in some embodiments.

An audio circuit 36, a loudspeaker 361 and a microphone 362 may provide an audio interface between a user and the mobile phone. In an aspect, the audio circuit 36 may convert received audio data into an electric signal and transmit the electric signal to the loudspeaker 361, and a voice signal is converted from the electric signal and then outputted by the loudspeaker 361. In another aspect, the microphone 362 converts captured voice signal into an electric signal, and the electric signal is received and converted into audio data by the audio circuit 36. The audio data is outputted to the processor 30 for processing and then sent to another mobile phone via the RF circuit 31; or the processor 30 outputs the audio data to the memory 33 for further processing.

Optionally, the mobile phone shown in FIG. 4 may further include various sensors, for example, a gyroscope sensor, a hygrometer sensor, an infrared sensor, and a magnetometer sensor, which is not limited hereto.

Optionally, the mobile phone shown in FIG. 4 may further include a Wi-Fi module, a Bluetooth module, and so on, and details are not described herein.

Figure 5:
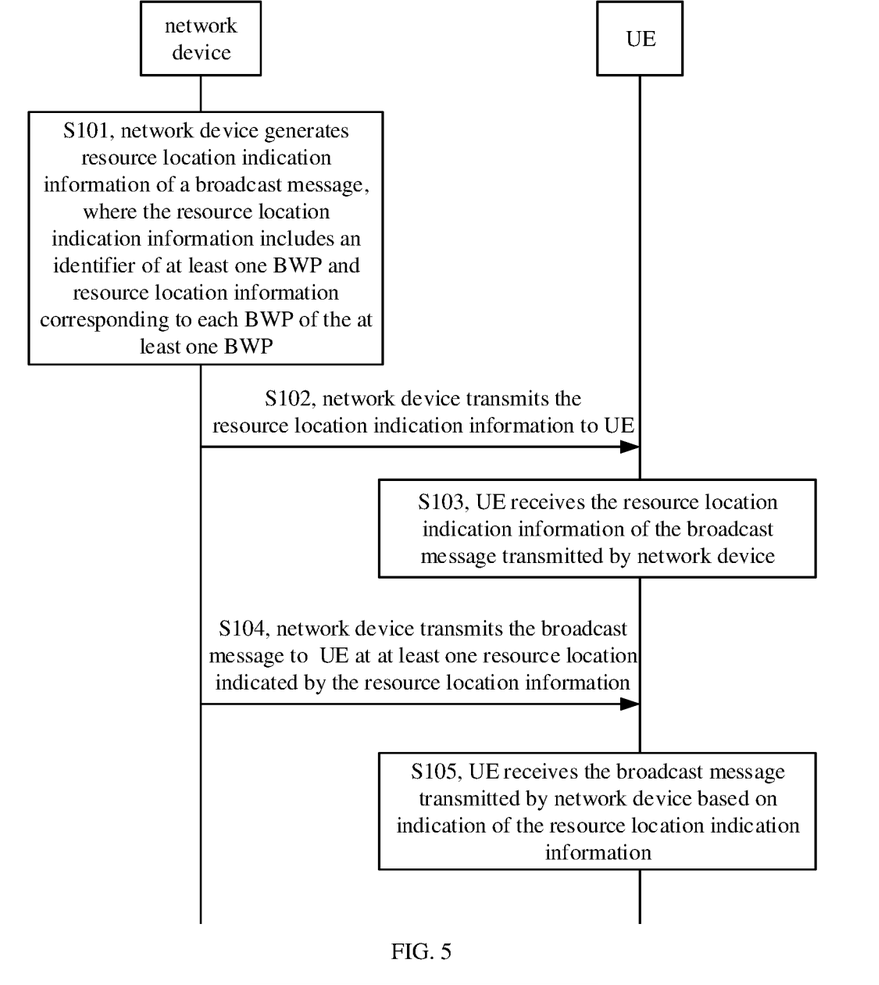
FIG. 5 is a schematic diagram of a method for indicating a resource location to receive a broadcast message according to an embodiment of the present disclosure.

With reference to the wireless communication system shown in FIG. 2, as shown in FIG. 5, an embodiment of the present disclosure provides a method for indicating a resource location to receive a broadcast message, which may include steps S101 to S105.

In step S101, a network device generates resource location indication information of the broadcast message, where the resource location indication information includes an identifier of at least one bandwidth part (BWP) and resource location information corresponding to each BWP of the at least one BWP.

In an embodiment of the present disclosure, the identifier of the at least one BWP may include identifiers of all BWPs constituting a system bandwidth, or may include identifiers of some BWPs among all the BWPs constituting a system bandwidth, which is not limited in the embodiments of the present disclosure.

In step S102, the network device transmits the resource location indication information to a UE.

In the embodiment of the present disclosure, the above-mentioned resource location information may be used to indicate the resource location where the UE receives the broadcast message transmitted by the network device (hereinafter, the network device transmitting a broadcast message is understood as the network device broadcasting a broadcast message), and the network device may transmit the generated resource location indication information to the UE. The UE is indicated to use the BWP where the UE is currently working, and the UE receives the broadcast message transmitted by the network device under indication of the resource location indication information.

As an example, the resource location indication information includes identifiers of five BWPs, and resource location indication information corresponding to each BWP in the five BWPs. As shown in Table 1, an example of the content included in the resource location indication information is given.

TABLE 1

| Identifier of BWP | resource location indication information |
| --- | --- |
| BWP1 | resource location indication information 1 |
| BWP2 | resource location indication information 2 |
| BWP3 | resource location indication information 3 |
| BWP4 | resource location indication information 4 |
| BWP5 | resource location indication information 5 |

Optionally, in an embodiment of the present disclosure, the resource location indication information in a resource location indication message may include at least one of the following four types of indication information A1 to A4.

The indication information A1 includes time-domain indication information for the UE to receive the broadcast message.

In an embodiment of the present disclosure, the time-domain indication information for the UE to receive the broadcast message may include at least one of: a time when the UE receives the broadcast message, a cycle during which the UE receives the broadcast message, a length of a subframe where the UE receives the broadcast message, or a length of a cyclic prefix (CP) of an orthogonal frequency division multiplexing (OFDM) symbol on which the UE receives the broadcast message.

Exemplarily, an example is given that the time-domain indication information is the cycle during which the UE receives the broadcast message, the network device periodically transmits a broadcast message at a certain cycle, and the UE may also use this cycle to periodically receive the broadcast message transmitted by the network device, which can ensure that the UE receives the broadcast message smoothly.

It should be noted that, in an embodiment of the present disclosure, the above-mentioned time-domain indication information may further include other information that is able to indicate time-domain locations, which may be specifically determined according to actual application requirements, and is not limited in the embodiments of the present disclosure.

The indication information A2 includes frequency-domain indication information for the UE to receive the broadcast message.

In an embodiment of the present disclosure, the frequency-domain indication information for the UE to receive the broadcast message may include at least one of: a location of a physical resource block (PRB) where the UE receives the broadcast message, a spacing of a subcarrier where the UE receives the broadcast message, a frequency point where the UE receives the broadcast message, an identifier of a BWP where the UE receives the broadcast message, or a bandwidth of a frequency where the UE receives the broadcast message.

Exemplarily, an example is given that the frequency-domain indication information is a location of a PRB where the UE receives the broadcast message, the network device transmits a broadcast message at a certain PRB location, and the UE receives, at the corresponding PRB location, the broadcast message that is transmitted by the network device. In such a manner, it can be guaranteed that the UE smoothly receives the broadcast message.

It should be noted that, in an embodiment of the present disclosure, the above-mentioned frequency-domain indication information may further include other information that can indicate frequency-domain locations, which may be specifically determined according to actual application demands, and is not limited in the embodiments of the present disclosure.

The indication information A3 includes code-domain indication information for the UE to receive the broadcast message.

In an embodiment of the present disclosure, the code-domain indication information for the UE to receive the broadcast message may include an encoding manner in which the UE receives the broadcast message, and/or an identifier of an encoding manner in which the UE receives the broadcast message.

Exemplarily, an example is given that the code-domain indication information is an encoding manner in which the UE receives the broadcast message. The network device encodes a broadcast message to be transmitted in a certain encoding manner, and then transmits the encoded broadcast message to the UE, and the UE decodes the received broadcast message in a corresponding decoding manner, so that the UE can smoothly receive the broadcast message.

It should be noted that, in an embodiment of the present disclosure, the above code-domain indication information may further include other information that is capable of indicating code-domain locations, which may be specifically determined according to actual application demands, and is not limited in the embodiments of the present disclosure.

The indication information A4 includes space-domain indication information for the UE to receive the broadcast message.

In an embodiment of the present disclosure, the space-domain indication information includes at least one of: an identifier of a transmission node where the UE receives the broadcast message, an identifier of a beam through which the UE receives the broadcast message, an identifier of a beam group through which the UE receives the broadcast message, or an identifier of a beam pair through which the UE receives the broadcast message.

Exemplarily, an example is given that the space-domain indication information is an identifier of a beam through which the UE receives the broadcast message. The network device transmits a broadcast message to the UE by using a beam identified by a certain beam identifier, and the UE receives the broadcast message by using this beam, so that the UE can be guaranteed to receive broadcast messages smoothly.

It should be noted that, in an embodiment of the present disclosure, the above space-domain indication information may further include other information that can indicate space-domain locations, which may be specifically determined according to actual application requirements, and is not limited in the embodiments of the present disclosure.

In an embodiment of the present disclosure, the broadcast message transmitted by the network device may include at least one of: system information, scheduling information of the system information, a paging message, or scheduling information of the paging message. The system information may include a master information block (MIB), remaining system information (RMSI), other system information (OSI), and the like. The scheduling information of the system information may include scheduling information of RMSI, scheduling information of OSI, and the like.

Optionally, in an embodiment of the present disclosure, the MIB may include information for transmitting system synchronization information. For example, the MIB may include a system frame number.

In an optional embodiment of the present disclosure, during a process that the network device transmits the MIB to the UE, RMSI scheduling information may be carried in the MIB and transmitted to the UE, so that the network device transmits RMSI to the UE according to the RMSI scheduling information. The RMSI includes some pieces of information used for the UE to access an access network. For example, the RMSI may include access control information for controlling UE to access a network.

In an optional embodiment of the present disclosure, during a process of transmitting RMSI to the UE by the network device, OSI scheduling information may be carried in the RMSI and transmitted to the UE, so that the network device transmits OSI to the UE according to the OSI scheduling information. The OSI includes cell selection information about a transmission of a neighboring cell. For example, the OSI may include a frequency point of a neighboring cell.

In an embodiment of the present disclosure, the network device may broadcast a paging message whether the UE is in an idle mode or a non-idle mode. When the UE is in an idle mode, the network device can know a location of the UE by broadcasting a paging message, or the network device may notify the UE of a new service needed to be processed by broadcasting a paging message. When the UE is in a non-idle mode, the network device may notify the UE that system information of a communication system has changed by broadcasting a paging message.

It should be noted that in an embodiment of the present disclosure, the above-mentioned RMSI scheduling information may not be carried in the MIB for transmission, and the network device may separately transmit RMSI scheduling information to the UE. Similarly, the above-mentioned OSI scheduling information may not be carried in the RMSI for transmission, and the network device may separately transmit OSI scheduling information to the UE.

In step S103, the UE receives the resource location indication information of the broadcast message transmitted by the network device.

In an embodiment of the present disclosure, the UE may obtain the resource location indication information of the broadcast message by receiving the resource location indication information of the broadcast message transmitted by the network device.

Optionally, the UE may also obtain predefined resource location indication information. In this case, the network device does not need to transmit indication information about a resource location to the UE, and the network device and the UE pre-agree a resource location where the UE receives a broadcast message. In this way, the UE receives a broadcast message transmitted by the network device according to a resource location indicated by predetermined (i.e., predefined) resource location indication information.

In step S104, the network device transmits the broadcast message to the UE at at least one resource location indicated by the resource location information.

It can be understood that when a network device transmits (or broadcasts) information to a UE, in order to ensure that the UE is able to receive the information transmitted by the network device, the network device transmits a broadcast message to the UE at at least one resource location indicated by the resource location information, or the network device transmits (or broadcasts) information in a frequency band within a frequency range supported by a capability of the UE. In such a way, the UE is able to receive the broadcast message at a resource location indicated by the resource location indication information, or within a frequency range where supports the transmission of the broadcast message.

In step S105, the UE receives the broadcast message transmitted by the network device based on indication of the resource location indication information.

It should be noted that, in an embodiment of the present disclosure, when a UE uses a BWP to transmit data, the UE may work in a frequency band (for example, the frequency band may be referred to as a frequency range 1) in a frequency range supported by the UE. Based on the related description in the above embodiments, a network device may transmit a broadcast message in a frequency band (for example, the frequency band may be referred to as a frequency range 2) within the frequency range supported by the UE. The frequency range 2 may be within the frequency range 1, or the frequency range 2 may not be within the frequency range 1.

As an example, in a case that a UE works in a certain BWP, a frequency range supported by the UE is from 50 MHZ to 100 MHZ. In this case, when a frequency range where the UE currently works (i.e., a frequency range 1) is from 55 MHZ to 60 MHZ, and a frequency range within which a network device transmits a broadcast message (i.e., a frequency range 2) is from 65 MHZ to 70 MHZ, it is obvious that the frequency range 2 is not within the frequency range 1; and when the frequency range 1 is from 55 MHZ to 60 MHZ and the frequency range 2 is from 54 MHZ to 58 MHZ, it may be known that the frequency range 2 is within the frequency range 1.

In embodiments of the present disclosure, the UE may receive a broadcast message transmitted by the network device at a resource location (including at least one of: a time-domain location, a frequency-domain location, a code-domain location, or a space-domain location), which is indicated by resource location indication information transmitted by the network device. However, a frequency range in which the network device transmits the broadcast message may be within a frequency range in which the UE is currently working, or may be beyond the frequency range in which the UE is currently working. In a case that the frequency range in which the network device transmits the broadcast message may be within the frequency range in which the UE is currently working, it means that the UE is able to receive the broadcast message within the frequency range where the UE is currently working; and in a case that the frequency range in which the network device transmits the broadcast message is not within the frequency range in which the UE is currently working, it means that the UE is unable to receive the broadcast message within the frequency range where the UE is currently working, and the UE needs to switch a frequency range in which the UE works to a frequency range in which the UE is capable of receiving the broadcast message. Therefore, when receiving a broadcast message, the UE needs to determine whether a frequency range in which the broadcast message is transmitted is within a frequency range in which the UE is currently working, and determine whether the frequency range in which the UE works needs to be switched according to actual situations, so as to receive the broadcast message.

Optionally, in a case that the frequency range within which the broadcast message is transmitted by the network device is within the frequency range where the UE currently works, the above step S105 may be implemented by step S105a.

In step S105a, in a case that a frequency range in which the broadcast message is transmitted by the network device is within a first frequency range, the UE receives the broadcast message within the first frequency range based on the resource location indication information.

The first frequency range is a frequency range in which the UE currently transmits data.

In an embodiment of the present disclosure, in a case that the frequency range in which the broadcast message is transmitted by the network device falls within the frequency range in which the UE is currently working (that is, the above-mentioned first frequency range), the UE may directly receive the broadcast message under the indication of the resource location indication information, and the UE does not need to switch the frequency range in which the UE works.

As an example, it is assumed that a UE works in BWP1, and in resource location indication information, resource location information corresponding to BWP1 is resource location information 1, the UE receives a broadcast message by using BWP1 in the first frequency range, specifically, at a resource location indicated by resource location information 1.

It should be noted that, in an embodiments of the present disclosure, in a case that the frequency range in which the broadcast message is transmitted by the network device is not within the frequency range in which the UE is currently working, the UE may switch the frequency range in which the UE works to a frequency range in which the broadcast message is able to be received, and the switching may be under control of the network device, or active switching by the UE.

In an implementation, in a case that a frequency range within which a broadcast message is transmitted by a network device is beyond a frequency range where the UE currently works, the UE spontaneously switches the frequency range in which the UE works, and the above step S105 may be implemented by step S105b.

In step S105b, in a case that a frequency range in which the broadcast message is transmitted by the network device is not within a first frequency range, the UE switches the frequency range in which the UE works to a second frequency range, and receives the broadcast message within the second frequency range based on the resource location indication information, where the frequency range in which the broadcast message is transmitted by the network device is within the second frequency range.

In the embodiment of the present disclosure, in a case that a frequency range where the network device transmits a broadcast message is not within the first frequency range, a UE may actively switch a frequency range in which the UE works, and the UE may switch the frequency range in which the UE works to a second frequency range, which includes the frequency range where the broadcast message is transmitted by the network device. In this way, the broadcast message transmitted by the network device is received within the second frequency range and under indication of the resource location indication information.

As an example, a frequency range supported by a UE is from 50 MHZ to 100 MHZ, in a case that a frequency range where the UE currently works (i.e., the above-mentioned first frequency range) is from 55 MHZ to 60 MHZ, and a frequency range in which a network device transmits a broadcast message is from 65 MHZ to 70 MHZ, the UE may switch the frequency range where the UE works from 55 MHZ-60 MHZ to 50 MHZ-70 MHZ. In such a manner, the UE may receive the broadcast message in the frequency range from 50 MHZ to 70 MHZ.

It should be noted that, in an embodiment of the present disclosure, when the UE spontaneously switches the frequency range in which the UE works, the second frequency range may be any frequency range within the frequency range supported by the UE, and may include the frequency range in which the network device transmits broadcast messages, which may be specifically determined according to actual requirements of users, and is not limited in the embodiments of the present disclosure.

Optionally, in an embodiment of the present disclosure, the UE may actively switch a frequency range where the UE works from the first frequency range to the second frequency range when performing synchronization signal calibration. No downlink data is transmitted between the network device and the UE, thereby reducing adverse effect of receiving downlink data within the first frequency range.

In an embodiment of the present disclosure, when a frequency range in which a UE currently works is not consistent with a frequency range where the network device transmits broadcast messages, the UE can timely adjust the frequency range in which the UE works, so as to improve a success rate of receiving broadcast messages.

In another implementation, in a case that a frequency range within which a broadcast message is transmitted by a network device is beyond a frequency range where the UE currently works, the UE switches the frequency range in which the UE works under the control of the network device. Prior to the foregoing step S105, the method for indicating a resource location to receive a broadcast message may further include steps S106 and S107.

In step S106, the network device determines whether a frequency range in which the broadcast message is transmitted by the network device is within a first frequency range.

In step S107, the network device transmits first control information to the UE, in a case that the network device determines that the frequency range in which the broadcast message is transmitted by the network device is not within the first frequency range.

The first control information includes a second frequency range, and the first control information is used to indicate the UE to switch a frequency range in which the UE works from the first frequency range to the second frequency range. The first frequency range is a frequency range in which the UE currently works, and the frequency range in which the broadcast message is transmitted is within the second frequency range.

In an embodiment of the present disclosure, the network device may obtain the frequency range in which the UE is currently working, so as to determine whether the frequency range where the broadcast message is transmitted by the network device is within the first frequency range. In a case that the frequency range where the broadcast message is transmitted by the network device is not in the first frequency range, the network device may transmit control information (for example, first control information), in which the second frequency range is carried, to the UE, so as to instruct the UE to switch the frequency range where the UE works from the first frequency range to the second frequency range.

Based on the above steps S106 and S107, the above step S105 can be specifically implemented by steps S105c and S105d.

In step S105c, the UE receives first control information transmitted by the network device.

In step S105d, the UE switches the frequency range in which the UE works from the first frequency range to the second frequency range based on the first control information, and the UE receives a broadcast message within the second frequency range based on the resource location indication information.

In an embodiment of the present disclosure, after the UE switches the frequency range in which the UE works to the second frequency range indicated by the first control information, the UE can receive a broadcast message within the second frequency range and based on indication of the resource location indication information, because the frequency range where the broadcast message is transmitted by the network device is within the second frequency range.

In an embodiment of the present disclosure, a network device transmits the first control information to a UE. Therefore, the UE can timely adjust a frequency range in which the UE works, when a frequency range in which the UE currently works is inconsistent with a frequency range where the network device transmits broadcast messages, thereby improving a success rate of receiving broadcast messages.

In an optional embodiment of the present disclosure, in a process of transmitting downlink control information (which may be understood as the above-mentioned first control information) to the UE, a network device may transmit downlink control information that carries the second frequency range to the UE. Since there is no transmission of downlink data between the network device and the UE in the process of transmitting downlink control information, adverse effect on receiving downlink data within the first frequency range can be reduced.

Understandably, in an embodiment of the present disclosure, after the UE successfully receives a broadcast message transmitted by the network device, the frequency range in which the UE works can be re-switched from the above-mentioned second frequency range to the first frequency range, thereby avoiding influences on other services of the UE.

Optionally, the UE may re-switch a frequency range where the UE operates from the second frequency range to the first frequency range spontaneously or under the control of the network device.

Specifically, in a case that the UE spontaneously switches the frequency range in which the UE operates, after the UE successfully receives, within the second frequency range, a broadcast message transmitted by the network device, the method for indicating a resource location to receive a broadcast message provided by an embodiment of the present disclosure may further include step S108a.

In step S108a, the UE switches the frequency range in which the UE works from the second frequency range to the first frequency range again.

Optionally, after synchronization signal calibration is completed, the UE may switch the frequency range where the UE works from the second frequency range to the first frequency range. In this way, the UE can continue to receive downlink data in the first frequency range.

In a case that the UE switches the frequency range where the UE works under the control of the network device, the method for indicating a resource location to receive a broadcast message provided by an embodiment of the present disclosure may further include steps S108b to S108e.

In step S108b, the network device determines whether the UE switches a frequency range in which the UE works from a first frequency range to a second frequency range, and whether the UE successfully receives the broadcast message within the second frequency range.

In step S108c, the network device transmits second control information to the UE, in a case that the network device determines that the UE has successfully received the broadcast message within the second frequency range.

The second control information includes the above first frequency range, and the second control information is used to indicate re-switching the frequency range in which the UE works from the second frequency range to the first frequency range.

In step S108d, the UE receives the second control information transmitted by the network device.

In step S108e, the UE re-switches the frequency range in which the UE works from the second frequency range to the first frequency range based on the second control information.

Based on the method for indicating a resource location to receive a broadcast message according to the embodiments of the present disclosure, a network device may generate resource location indication information of a broadcast message and transmit the resource location indication information to a UE; and after the UE obtains the resource location indication information, the UE may receive the broadcast message transmitted by the network device based on indication of the resource location indication information. As compared with the related art, in the embodiments of the present disclosure, since a network device can configure resource location indication information for receiving broadcast messages for a UE, the UE can receive the broadcast message based on the resource location indication information, which avoids a problem that the UE cannot receive broadcast messages from the network device in a case that the UE works only in a narrow bandwidth, and can ensure that the UE receives broadcast messages smoothly.

The solutions provided by the embodiments of the present disclosure are described in the above mainly from the perspective of interaction among various network elements. It can be understood that, in order to implement the above functions, each network element, such as a network device or a UE, includes a hardware structure and/or a software module used to achieve a corresponding function. A person of ordinary skill in the art should easily realize that, in combination with the units and algorithm steps of the examples described in the embodiments disclosed in the specification, the embodiments of the present disclosure can be implemented in the form of hardware or in the form of a combination of hardware and computer software. Whether a certain function is performed by hardware or computer software driven by hardware depends on specific applications and design constraints of a technical solution. A person skilled in the art can implement the described functions by using different methods for each specific application, but such implementations should not be considered beyond the scope of the present application.

In the embodiments of the present disclosure, functional modules of a network device, a UE, and the like can be divided according to the above method embodiments. For example, functional modules may be divided to correspond to respective functions, or two or more functions may be integrated into one processing module. The above integrated modules can be implemented in a form of hardware or software functional modules. It should be noted that the division of modules in the embodiments of the present disclosure is exemplary, and is only a logical function division. There may be other division manners in actual implementations.

Figure 6:
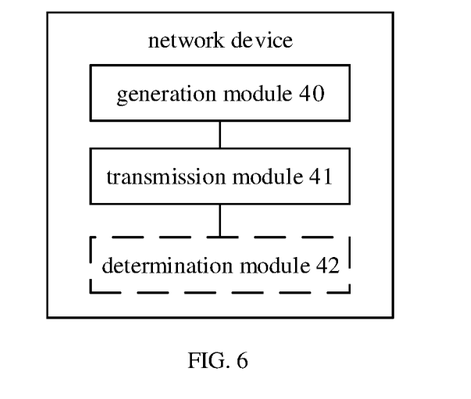
FIG. 6 is a schematic structural diagram of a network device according to an embodiment of the present disclosure.

In a case that functional modules are divided according to various functions, FIG. 6 shows a possible structural diagram of a network device involved in the foregoing embodiments. As shown in FIG. 6, the network device may include a generation module 40 and a transmission module 41. The generation module 40 may be configured to support the network device to perform step S101 in the above method embodiments. The transmission module 41 may be configured to support the network device to perform steps S102, S104, S107, and S108c in the above method embodiments. Optionally, as shown in FIG. 6, the network device may further include a determination module 42. The determination module 42 may be configured to support the network device to perform steps S106 and S108b in the foregoing method embodiments. Reference can be made to all the relevant content of various steps involved in the above method embodiments for functional descriptions of corresponding functional modules, which will not be repeated herein.

In case of using an integrated unit, a network device provided by an embodiment of the present disclosure may be the network device shown in FIG. 3 in the foregoing embodiments. Specifically, the processor may be configured to control and manage actions of the network device. For example, the processor may be configured to enable the network device to perform steps S101, S106, and S108b in the foregoing method embodiments, and/or to perform other processes used in the technology described in the present specification. The radio frequency unit may be configured to enable the network device to communicate with other network entities. For example, the radio frequency unit may be configured to support the network device to perform steps S102, S104, S107, and S108c in the foregoing method embodiments.

Figure 7:
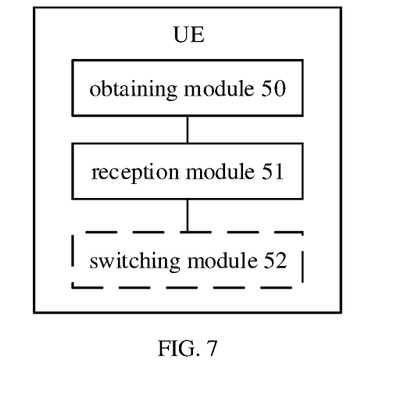
FIG. 7 is a schematic structural diagram of a UE according to an embodiment of the present disclosure.

In a case that various functional modules are divided to correspond to respective functions, FIG. 7 shows a possible structural diagram of a UE involved in the foregoing embodiments. As shown in FIG. 7, the UE may include an obtaining module 50 and a reception module 51. The obtaining module 50 may be configured to support the UE to perform step S103 in the foregoing method embodiments. The reception module 51 may be configured to support the UE to perform step S105 (including step S105a, or part step in step S105b, or step S105c) and step S108d in the above method embodiments. Optionally, as shown in FIG. 7, the UE may further include a switching module 52. The switching module 52 may be configured to support the UE to perform part step in S105b, step S105d, step S108a, and step S108e in the foregoing method embodiments. Reference can be made to all the relevant content of various steps involved in the above method embodiments for functional descriptions of corresponding functional modules, which are not be repeated herein.

In case of using an integrated unit, a UE provided in an embodiment of the present disclosure may be the mobile phone as shown in FIG. 4 in the foregoing embodiments. Specifically, the processor 30 may be configured to control and manage operations of the UE. For example, the processor 30 may be configured to support the UE to perform step S103, part step in step S105b, step S105d, step S108a, and step S108e in the above method embodiments, and/or other procedures used in the technology described in the present specification. The RF circuit 31 may be configured to support communication between the UE and other network entities. For example, the RF circuit 31 may be configured to support the UE to perform step S105 (including step S105a, or part step in step S105b, or step S105c) and step S108d in the above method embodiments.

Part or all of the above embodiments can be implemented by software, hardware, firmware, or any combination thereof. When an embodiment is implemented using a software program, part or all of processes in the embodiment can be implemented in a form of a computer program product. The computer program product includes one or more computer instructions. When the computer instructions are loaded and executed on a computer, the processes or functions according to the embodiments of the present disclosure are partially or completely generated. The computer may be a general-purpose computer, a special-purpose computer, a computer network, or other programmable devices. The computer instructions may be stored in a computer-readable storage medium or transmitted from one computer-readable storage medium to another computer-readable storage medium. As an example, the computer instructions may be transmitted from a website site, a computer, a server, or a data center to another website site, another computer, another server, or another data center in a wired manner (such as, using a coaxial cable, an optical fiber, and a digital subscriber line (DSL)), or in a wireless manner (such as, using infrared wave, radio wave, and microwave). The computer-readable storage medium may be any available medium that can be accessed by a computer or a data storage device including one or more available medium that are integrated, such as a server, a data center, and the like. The available medium may be a magnetic medium (for example, a floppy disk, a magnetic disk, and a magnetic tape), an optical medium (for example, a digital video disc (DVD)), or a semiconductor medium (for example, a solid state driver (SSD)), etc.

Based on the descriptions of the above embodiments, those skilled in the art can clearly understand that the division of the above functional modules is only as an example, for convenience and brevity of the description. In practical applications, the above functions may be implemented by configuring the functions to different functional modules according to requirements, that is, the internal structure of a device is divided into different functional modules to perform part or all of the above functions. For specific operating processes of the systems, devices, and units described above, reference may be made to the corresponding processes in the foregoing method embodiments, and details are not described herein again.

In the several embodiments provided in this application, it should be understood that the disclosed systems, devices, and methods may be implemented in other ways. For example, the above device embodiments are only schematic. For example, the division of the modules or the units is only a logical function division. In actual implementations, there may be another division manner. For example, multiple units or components may be combined or integrated into another system, and part of features can be ignored or not performed. In addition, the disclosed or discussed mutual coupling or direct coupling or communication connection may be indirect coupling or communication connection between or among devices or units through some interfaces, which may be in electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objective of the solutions of the embodiments.

In addition, various functional units in various embodiments of the present application may be integrated into one processing unit, or each of the units may exist alone physically, or two or more units may be integrated into one unit. The above integrated unit may be implemented in a form of hardware or in a form of software functional unit.

In a case that an integrated unit is implemented in a form of software functional unit, and is sold or used as an independent product, the integrated unit may be stored in a computer-readable storage medium. Based on such understanding, essential part or the part contributing to the prior art of the technical solutions of the present disclosure, or part or all of the technical solutions may be implemented in a form of a software product. The software product is stored in a storage medium, and includes several instructions for instructing a computer device (which may be a personal computer, a server, or a network device) to perform part or all of steps of the methods described in various embodiments of the present disclosure. The foregoing storage medium includes any medium that can store a program code, such as a flash memory, a mobile hard disk, a read-only memory, a random access memory, a magnetic disk, or an optical disk.

The above descriptions are merely specific implementations of the present disclosure, but the scope of the present disclosure is not limited thereto. Any modifications and substitutions easily made by a person of ordinary skill in the art without departing from the technical principle of the present disclosure shall fall within the scope of the present disclosure. Therefore, the scope of the present disclosure shall be determined by the claims.

What is claimed is:

1. A method for indicating a resource location to receive a broadcast message, applied to a network device, and comprising:
   generating resource location indication information of the broadcast message, wherein the resource location indication information comprises an identifier of at least one bandwidth part (BWP) and resource location information corresponding to each BWP in the at least one BWP, and the resource location information is used to indicate the resource location where a user equipment (UE) receives the broadcast message transmitted by the network device; and
   transmitting the resource location indication information to the UE,
   wherein the broadcast message comprises remaining system information (RMSI).

2. The method according to claim 1, wherein after transmitting the resource location indication information to the UE, the method further comprises:
   transmitting the broadcast message to the UE at at least one resource location indicated by the resource location information.

3. The method according to claim 1, wherein the resource location indication information comprises at least one of the following four types of indication information:
   time-domain indication information for the UE to receive the broadcast message;
   frequency-domain indication information for the UE to receive the broadcast message;
   code-domain indication information for the UE to receive the broadcast message; or
   space-domain indication information for the UE to receive the broadcast message.

4. The method according to claim 3, wherein the time-domain indication information comprises at least one of a time when the UE receives the broadcast message, a cycle during which the UE receives the broadcast message, a length of a subframe where the UE receives the broadcast message, or a length of a cyclic prefix (CP) of an orthogonal frequency division multiplexing (OFDM) symbol where the LIE receives the broadcast message; and/or
   the frequency-domain indication information comprises at least one of: a location of a physical resource block (PRB) where the UE receives the broadcast message, a spacing of a subcarrier where the UE receives the broadcast message, a frequency point where the UE receives the broadcast message, an identifier of a MVP where the UE receives the broadcast message, or a bandwidth of a frequency where the UE receives the broadcast message; and/or
   the code-domain indication information comprises at least one of: an encoding manner in which the UE receives the broadcast message, or an identifier of an encoding manner in which the UE receives the broadcast message; and/or
   the space-domain indication information comprises at least one of: an identifier of a transmission node where the UE receives the broadcast message, an identifier of a beam through which the UE receives the broadcast message, an identifier of a beam group through which the UE receives the broadcast message, or an identifier of a beam pair through which the UE receives the broadcast message.

5. The method according to claim 1, wherein the broadcast message further comprises at least one of:
   a master information block (MIB), RMSI scheduling information, other system information (OSI), OSI scheduling information, a paging message, or scheduling information of a paging message.

6. The method according to claim 1, further comprising:
   transmitting, by the network device, first control information to the UE, in a case that it is determined that a frequency range in which the broadcast message is transmitted by the network device is not within a first frequency range,
   wherein the first control information comprises a second frequency range, and the first control information is used to indicate switching a frequency range in which the UE works from the first frequency range to the second frequency range, the first frequency range is a frequency range in which the UE currently works, and the frequency range in which the broadcast message is transmitted is within the second frequency range.

7. The method according to claim 1, further comprising:
   transmitting, by the network device, second control information to the UE, in a case that it is determined that the UE has switched a frequency range in which the UE works from a first frequency range to a second frequency range, and the UE has successfully received the broadcast message within the second frequency range;
   wherein the second control information comprises the first frequency range, and the second control information is used to indicate re-switching the frequency range in which the UE works from the second frequency range to the first frequency range.

8. A method for indicating a resource location to receive a broadcast message, applied to a user equipment (UE), and comprising:
   obtaining resource location indication information of the broadcast message, wherein the resource location indication information comprises an identifier of at least one bandwidth part (BWP) and resource location information corresponding to each BWP in the at least one BWP, and the resource location information is used to indicate the resource location where the UE receives the broadcast message transmitted by a network device; and
   receiving the broadcast message transmitted by the network device based on indication of the resource location indication information,
   wherein the broadcast message comprises remaining system information (RMSI).

9. The method according to claim 8, wherein the resource location indication information comprises at least one of the following four types of indication information:
   time-domain indication information for the UE to receive the broadcast message;
   frequency-domain indication information for the UE to receive the broadcast message;
   code-domain indication information for the UE to receive the broadcast message; or
   space-domain indication information for the UE to receive the broadcast message.

10. The method according to claim 9, wherein the time-domain indication information comprises at least one of: a time when the UE receives the broadcast message, a cycle during which the UE receives the broadcast message, a length of a subframe where the UE receives the broadcast message, or a length of a cyclic prefix (CP) of an orthogonal frequency division multiplexing (OFDM) symbol where the UE receives the broadcast message; and/or the frequency-domain indication information comprises at least one of: a location of a physical resource block (MB) where the UE receives the broadcast message, a spacing of a subcarrier where the UE receives the broadcast message, a frequency point where the UE receives the broadcast message, an identifier of a BWP where the UE receives the broadcast message, or a bandwidth of a frequency where the UE receives the broadcast message; and/or the code-domain indication information comprises at least one of: an encoding manner in which the UE receives the broadcast message, or an identifier of an encoding manner in which the UE receives the broadcast message; and/or the space-domain indication information comprises at least one of an identifier of a transmission node where the UE receives the broadcast message, an identifier of a beam through which the UE receives the broadcast message, an identifier of a beam group through which the UE receives the broadcast message, or an identifier of a beam pair through which the UE receives the broadcast message.

11. The method according to claim 8, wherein the broadcast message further comprises at least one of:

a master information block (MIB), RMSI scheduling information, other system information (OSI), OSI scheduling information, a paging message, or scheduling information of a paging message, wherein the obtaining the resource location indication information comprises:

receiving the resource location indication information transmitted by the network device; or obtaining predefined resource location indication information.

12. The method according to claim 8, wherein the receiving the broadcast message transmitted by the network device based on indication of the resource location indication information comprises:

receiving the broadcast message within a first frequency range based on the resource location indication information; in a case that a frequency range in which the broadcast message is transmitted by the network device is within the first frequency range, wherein the first frequency range is a frequency range in which the UE currently transmits data; and switching a frequency range in which the UE works to a second frequency range and receiving the broadcast message within the second frequency range based on the resource location indication information, in a case that the frequency range in which the broadcast message is transmitted by the network device is not within the first frequency range, wherein the frequency range in which the broadcast message is transmitted is within the second frequency range, or, wherein the receiving the broadcast message transmitted by the network device based on indication of the resource location indication information comprises:

receiving first control information transmitted by the network device, wherein the first control information comprises a second frequency range, the first control information is used to indicate switching a frequency range in which the UE works from a first frequency range to the second frequency range, the first frequency range is a frequency range in which the UE currently transmits data; and a frequency range in which the broadcast message is transmitted is within the second frequency range; and switching the frequency range in which the UE works from the first frequency range to the second frequency range based on the first control information, and receiving, by the UE, the broadcast message within the second frequency range based on the resource location indication information.

13. The method according to claim 12, wherein after receiving the broadcast message based on the resource location indication information, the method further comprises:

re-switching the frequency range in which the UE works from the second frequency range to the first frequency range, or, wherein after receiving the broadcast message based on the resource location indication information, the method further comprises:

receiving second control information transmitted by the network device, wherein the second control information comprises the first frequency range, and the second control information is used to indicate re-switching the frequency range in which the UE works from the second frequency range to the first frequency range; and re-switching the frequency range in which the UE works from the second frequency range to the first frequency range based on the second control information.

14. A network device, comprising a processor, a memory, and a program that is stored on the memory and executable on the processor, wherein when executing the program, the processor is configured to:

generate resource location indication information of a broadcast message, wherein the resource location indication information comprises an identifier of at least one bandwidth part (BWP) and resource location information corresponding to each BWP in the at least one BWP, and the resource location information is used to indicate a resource location where a user equipment (UE) receives the broadcast message transmitted by the network device; and transmit the resource location indication information to the UE, wherein the broadcast message comprises remaining system information (RMSI).

15. The network device according to claim 14, wherein the processor is further configured to transmit the broadcast message to the UE at at least one resource location indicated by the resource location information, after transmitting the resource location indication information to the UE.

16. The network device according to claim 14, wherein the resource location indication information comprises at least one of the following four types of indication information:

time-domain indication information for the UE to receive the broadcast message;

frequency-domain indication information for the UE to receive the broadcast message;

code-domain indication information for the UE to receive the broadcast message; or space-domain indication information for the UE to receive the broadcast message.

17. The network device according to claim 16, wherein the time-domain indication information comprises at least one of: a time when the UE receives the broadcast message, a cycle during which the UE receives the broadcast message, a length of a subframe where the UE receives the broadcast message, or a length of a cyclic prefix (CP) of an orthogonal frequency division multiplexing (OFDM) symbol where the UE receives the broadcast message; and/or
the frequency-domain indication information comprises at least one of: a location of a physical resource block (PRB) where the UE receives the broadcast message, a spacing of a subcarrier where the UE receives the broadcast message, a frequency point where the LTE receives the broadcast message, an identifier of a IMP where the UE receives the broadcast message, or a bandwidth of a frequency where the UE receives the broadcast message; and/or
the code-domain indication information comprises at least one of: an encoding manner in which the UE receives the broadcast message, or an identifier of an encoding manner in which the UE receives the broadcast message; and/or
the space-domain indication information comprises at least one of: an identifier of a transmission node where the UE receives the broadcast message, an identifier of a beam through which the UE receives the broadcast message, an identifier of a beam group through which the UE receives the broadcast message, or an identifier of a beam pair through which the UE receives the broadcast message.

18. The network device according to claim 14, wherein the broadcast message further comprises at least one of:
a master information block (MIB), RMSI scheduling information, other system information (OSI), OSI scheduling information, a paging message, or scheduling information of a paging message.

19. The network device according to claim 14, wherein the processor is configured to: determine whether a frequency range in which the broadcast message is transmitted within a first frequency range; and
transmit control information to the UE, after determining that the frequency range in which the broadcast message is transmitted is not within the first frequency range, wherein the control information comprises a second frequency range, the control information is used to indicate switching a frequency range in which the UE works from the first frequency range to the second frequency range, and the first frequency range is a frequency range in which the UE currently works, or
wherein the processor is configured to:
determine whether the UE switches a frequency range in which the UE works from a first frequency range to a second frequency range, and whether the UE successfully receives the broadcast message within the second frequency range; and
transmit control information to the UE, after determining that the UE has switched the frequency range in which the UE works from the first frequency range to the second frequency range, and that the UE has successfully received the broadcast message within the second frequency range, wherein the control information comprises the first frequency range, the control information is used to indicate re-switching the frequency range in which the UE works from the second frequency range to the first frequency range, and the frequency range in which the broadcast message is transmitted is within the second frequency range.

20. A user equipment, comprising: a processor, a memory, and a program that is stored on the memory and executable on the processor, wherein when executing the program, the processor is configured to implement the method for indicating a resource location to receive a broadcast message according to claim 8.

* * * * *